(12) United States Patent
Dussac et al.

(10) Patent No.: US 7,104,372 B2
(45) Date of Patent: *Sep. 12, 2006

(54) DAMPING STRUCTURE AND APPLICATIONS

(75) Inventors: Marc Francis Vincent Dussac, Miramas (FR); Philippe Vie, Toulouse (FR); Osmin Delverdier, St Jean Lherm (FR)

(73) Assignees: Eurocopter, Marignane Cedex (FR); Ateca, Mountauban (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/117,311

(22) Filed: Apr. 29, 2005

(65) Prior Publication Data

US 2005/0199458 A1    Sep. 15, 2005

Related U.S. Application Data

(62) Division of application No. 09/980,125, filed on Feb. 20, 2002, now Pat. No. 6,935,472.

(30) Foreign Application Priority Data

Apr. 12, 2000 (FR) .................................. 00 04680

(51) Int. Cl.
*F16F 7/10* (2006.01)
*B64C 27/00* (2006.01)

(52) U.S. Cl. .................... 188/380; 267/149; 244/17.27

(58) Field of Classification Search ................ 188/380, 188/378, 381, 379; 267/136, 140.2, 140.3, 267/140.4, 140.5, 141, 152, 153, 148, 149; 52/167.1–167.8; 244/17.11–17.26, 17.27, 244/17.28

See application file for complete search history.

(56) References Cited

U.S. PATENT DOCUMENTS

| 123,999 | A | 2/1872 | King |
| 1,995,620 | A | 3/1935 | Monroe |
| 2,417,347 | A | 3/1947 | Brown |
| 3,417,660 | A | 12/1968 | Harbrecht et al. |
| 3,929,729 | A | 12/1975 | Chung |
| 4,458,862 | A | 7/1984 | Mouille et al. |
| 4,504,044 | A | 3/1985 | Shtarkman |
| 4,509,730 | A | 4/1985 | Shtarkman |
| 4,566,678 | A | 1/1986 | Anderson |
| 4,713,917 | A | 12/1987 | Buckle et al. |
| 4,899,323 | A | 2/1990 | Fukahori et al. |
| 4,913,410 | A | 4/1990 | Marshall |

(Continued)

FOREIGN PATENT DOCUMENTS

EP    0499526 A1    8/1992

(Continued)

OTHER PUBLICATIONS

PCT International Search Report dated Jul. 26, 2001.

*Primary Examiner*—Pam Rodriguez
(74) *Attorney, Agent, or Firm*—Stevens, Davis, Miller & Mosher, LLP

(57) ABSTRACT

A damping structure includes a member defining an internal cavity; an aggregate which includes at least solid bodies in contact and which completely fills the internal cavity; a rigid plate for closing off the internal cavity; and an elastic element which exerts elastic pressure on the rigid plate so as to constrain the aggregate. The member defining the cavity may be elongate with the internal cavity being formed longitudinally inside the member. At least some of said solid bodies may be hollow or solid, compact, made of different materials, of different shapes, and/or of different sizes.

15 Claims, 4 Drawing Sheets

U.S. PATENT DOCUMENTS

| | | |
|---|---|---|
| 4,974,794 A | 12/1990 | Aubry et al. |
| 5,020,644 A | 6/1991 | Novoa |
| 5,316,240 A | 5/1994 | Girard et al. |
| 6,935,472 B1 * | 8/2005 | Dussac et al. .............. 188/380 |

FOREIGN PATENT DOCUMENTS

| | | |
|---|---|---|
| GB | 756835 | 9/1956 |
| GB | 1280301 | 7/1972 |
| GB | 1293391 | 10/1972 |
| WO | 8505425 | 12/1985 |
| WO | 9948951 | 9/1999 |

* cited by examiner

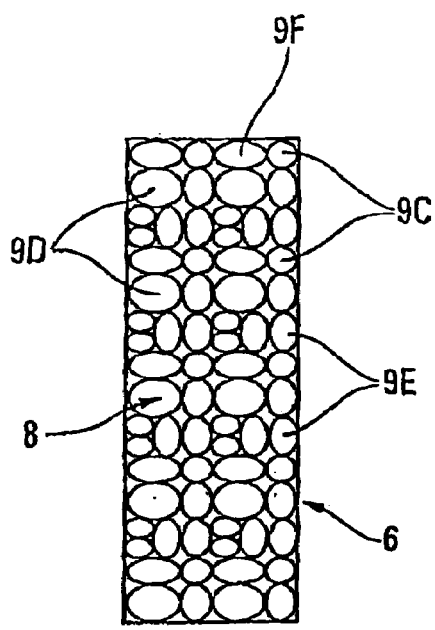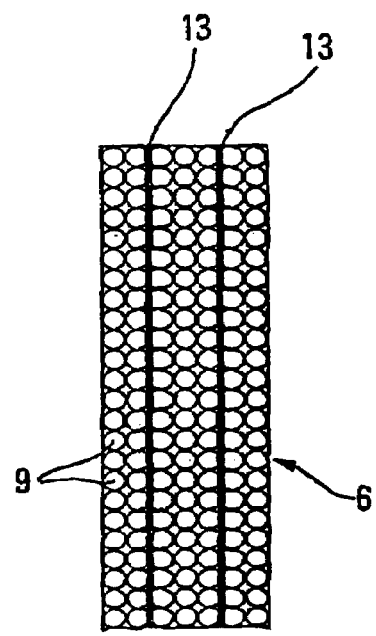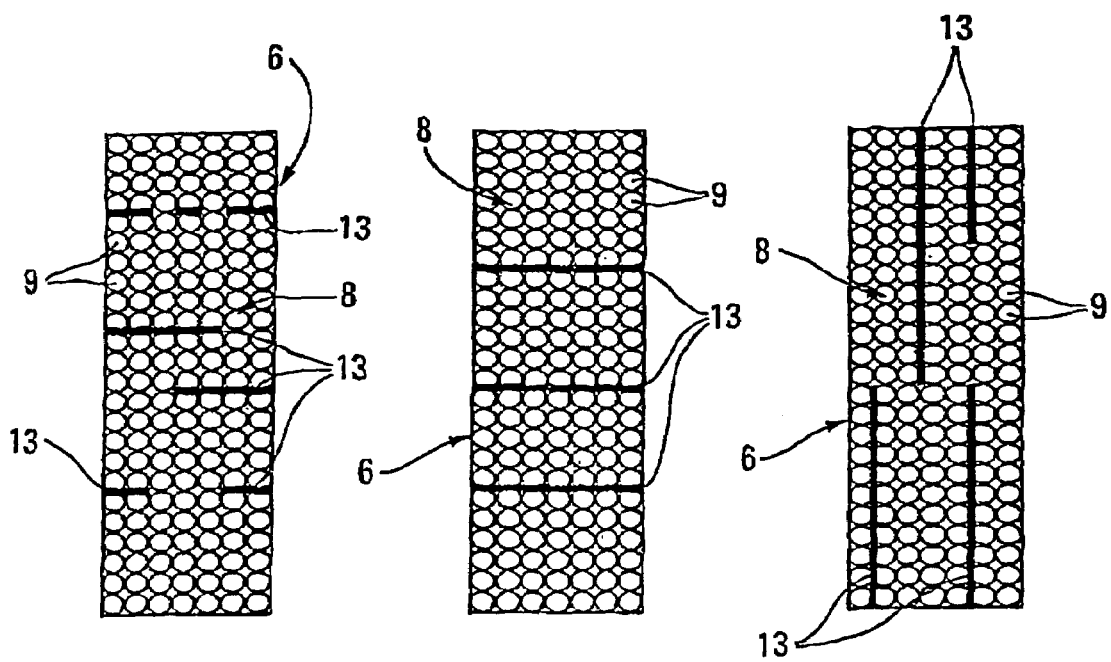

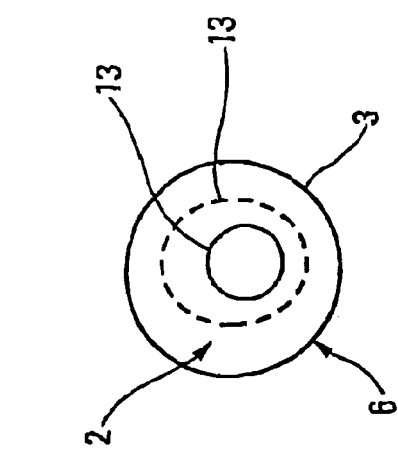
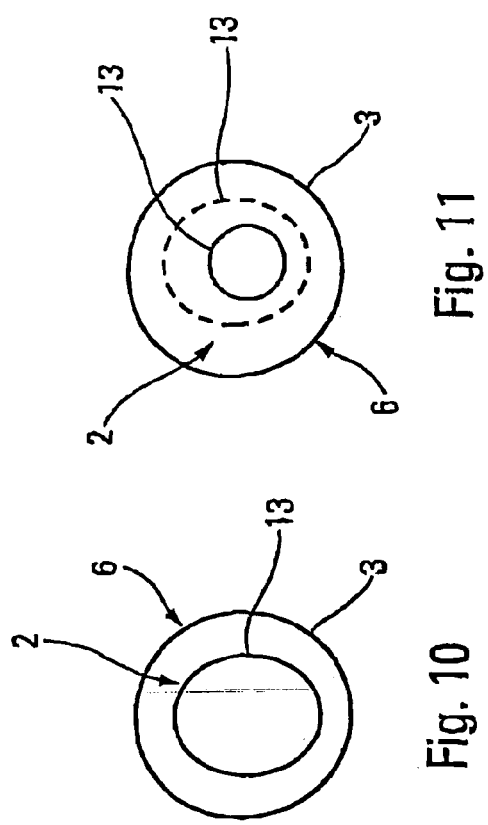
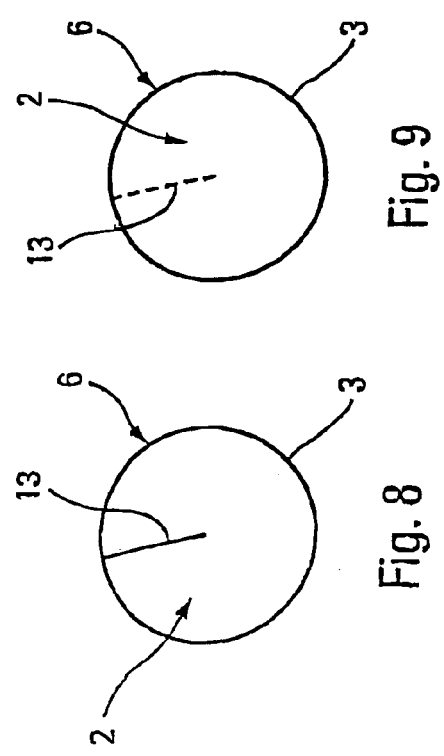
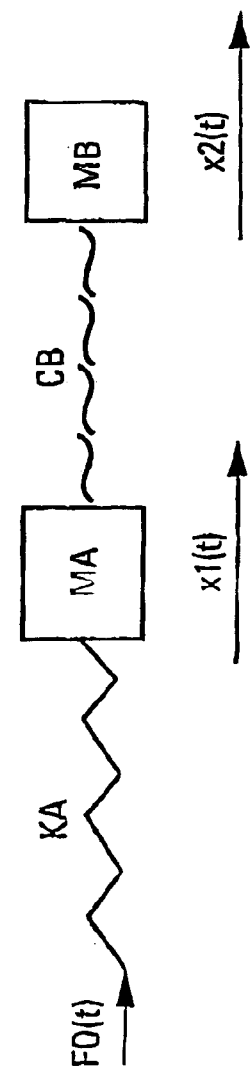

DAMPING STRUCTURE AND APPLICATIONS

This is a divisional of application Ser. No. 09/980,125 filed Feb. 20, 2002, now U.S. Pat. No. 6,935,472.

The present invention relates to a damping structure and applications of such a damping structure.

FIELD OF THE INVENTION

A preferred application relates to the use of the damping structure to damp out vibrations of vibrating components such as the main gearbox of a rotary wing aircraft, particularly a helicopter, especially with a view to reducing the noise in the cockpit and/or in the passenger cabin of said aircraft.

BACKGROUND OF THE RELATED ART

It is known that, in a rotary wing aircraft, the acoustic spectra defined in the range between 20 Hz and 20 kHz are the result of the superposition of noises of various origins which can be grouped into two different groups depending on their spectral characteristics, namely pure sounds or narrowband noise and broadband noise.

In the known way, pure sound or narrowband noise occurs in particular, as appropriate:
  at the characteristic frequencies of the aircraft driveline;
  at the rotational frequencies of the rotor blades (main and tail) and at the harmonics of these frequencies;
  at the rotational frequencies of the blades of the compressors of the turbine engine units; and/or
  at the rotational frequencies of the blades of the blowers that cool the main gearbox or distribute cabin air and/or of electrical equipment, and at the harmonics of these frequencies, while broadband noise comprises, in particular, as appropriate:
  the noise of the boundary layer that develops along the fuselage;
  the noise generated by the rotors;
  the noise of the air intake and nozzle flows;
  the engine noise; and/or
  the noise of the circuits that provide the cockpit or the passenger cabin with climate control or heating.

All this noise is of course troublesome for the pilots and the passengers.

There are various known solutions for reducing such noise inside a rotary wing aircraft, particularly a helicopter.

The object of a first known solution is to reduce the level of vibration or the radiation of sources of noise and/or of the fuselage. To this end, various physical actions can be taken, particularly:
  reducing the vibration of the structure and/or of mechanical parts, by damping or modifying the stiffness or the mass;
  attenuating the acoustic transmission, by damping or modifying the stiffness or the mass;
  a double baffle system, using a space which may or may not be filled with absorbent material, between the radiating structure and soundproofing panels;
  acoustic absorption using fibrous or cellular materials; and
  acoustic absorption using Helmholtz resonators.

The first four physical actions listed above make it possible to reduce the overall noise level in a broad range of frequencies, but would lead to a significant and highly disadvantageous increase in mass. In addition, the obtained reduction in noise is not selective enough to eliminate the acoustic annoyance specific to the emergence of pure sounds.

By contrast, the fifth and final physical action listed above makes it possible effectively to reduce narrowband noise, but still only in a narrow band of frequencies, defined during design.

This first solution listed above and based on a passive treatment of the noise is therefore not completely effective, particularly in the case of narrowband noise generated by vibrational excitation.

A second known solution recommends creating passive soundproofing in the form of cladding panels mounted in the cockpit or in the passenger cabin. These panels are designed according to the structural area that is to be treated and according to the spectrum of frequencies to be attenuated.

However, this second solution also has numerous disadvantages and, in particular:
  the noise reduction is limited, especially at low frequencies;
  the increase in mass is high, and may be several hundreds of kilograms in the case of a large-sized helicopter;
  there is a not insignificant loss of volume, especially when using thick panels with a view to improving the acoustic absorption effect; and
  there are acoustic leakages, particularly at the wiring holes and the joints between the panels.

In consequence, neither of these two known solutions listed above is satisfactory in reducing the annoyance caused by noise, particularly narrowband noise.

SUMMARY OF THE INVENTION

One of the objects of the present invention is to propose a solution that makes it possible to reduce such noise.

To this end, the present invention relates to a damping structure which is simple and inexpensive to produce, having numerous advantages and which can be used in various applications to deaden the vibrations generated by vibrating sources, particularly with a view to reducing noise, and to do so particularly in a rotary wing aircraft such as a helicopter.

To this end, said damping structure is notable, according to the invention, in that it has an internal cavity and comprises:
  an aggregate which comprises at least solid bodies in contact and which completely fills said internal cavity; and
  means for closing off the internal cavity and pressing said aggregate into said internal cavity.

Thus, when said structure is subjected to vibration, these vibrations are transmitted to the (contacting) solid bodies of the aggregate, via the various points of contact. On crossing each of these points of contact, some of the vibrational energy is dissipated through friction so that said vibration is then damped quickly and effectively within said structure.

As a preference, said structure is elongate, for example in the form of a bar, and said internal cavity is formed longitudinally inside said elongate structure.

In the context of the present invention, said solid bodies, which are, for example, made of synthetic material, preferably beads, may be:
  either compact, their entire mass then being occupied by material;

or hollow, which makes it possible to reduce the weight of said solid bodies and therefore also to reduce the weight of the structure.

In addition, according to the invention, said solid bodies may be made of different materials (synthetic material, metal, etc.) and/or have different shapes and/or different sizes (diameters).

It will be noted that:

a difference in inertia of said solid bodies, due in particular to different sizes or densities; and/or a difference in stiffness of said solid bodies, due especially to different materials (for example a material which is not very rigid and intrinsically has very good damping properties or a material which is more rigid and intrinsically has less good damping properties), give rise to a different movement under the effect of a vibrational excitation and therefore also to a different degree of damping. In consequence, through a suitable selection of these characteristics, it is possible to adjust and to optimize the damping performed by the damping structure according to the invention.

Furthermore, advantageously, said structure additionally comprises at least one internal partition, solid or pierced, of any shape, particularly tubular, which may or may not be secured to the wall of said structure and which is arranged inside said internal cavity.

This makes it possible to increase the area for exchange (friction) between the structure and the aggregate and therefore also the damping of the vibrations.

Furthermore, advantageously:

in that said aggregate additionally comprises a viscous liquid filling the spaces between said solid bodies; and/or said means for closing off said internal cavity comprise a rigid plate which is constrained by an elastic element.

In addition to the aforementioned advantages, the damping structure according to the invention also has the following advantages:

it can easily be produced and has a low manufacturing cost, particularly when the internal cavity already exists in the structure;

it is of low mass (particularly when use is made of hollow solid bodies) by comparison with certain known damping means, such as the bonding of viscoelastic materials, which may or may not be constrained, onto the surface of the structure that is to be damped;

the aggregate it contains is protected against external attack (fire, moisture, corrosive agents, etc.) by the structure itself;

it is effective over a broad band of frequencies and this is true for various types of deformation (bending, tension-compression, torsion, etc.) of the structure;

it is not subjected to phenomena of abrasion, corrosion or erosion, if an appropriate pair of materials is chosen for the wall of the structure and for the aggregate, respectively; and it leads to no change in the lifespan of the components with which it is associated.

In one particular application, said structure may be produced in the form of a hollow pinion (of a gearbox or of any other mechanical device) which is filled with said aggregate according to the invention.

The present invention also relates to a suspension system for a gearbox of a rotary wing aircraft, particularly a helicopter.

According to the invention, said suspension system which comprises a number of suspension bars is noteworthy in that at least one of said suspension bars comprises a structure as mentioned hereinabove.

Thus, the equivalent damping of at least one of said bars is improved, which makes it possible effectively, in the cockpit and/or the passenger cabin of the aircraft, to reduce the noise propagated through solid which is transmitted by said treated bars.

The present invention also relates to two types of damping device using the aforementioned structure, for damping the vibration of any vibrating component, for example:

a connecting rod;

an engine;

a gearbox; or a rotary part such as a compressor or a fan for example.

A first of these damping devices comprises a damping structure according to the invention which is arranged between the vibrating component and a support.

It will be noted that the structure used is rigid and can either be attached in an empty space or directly replace an element that already exists for performing other functions, particularly mechanical or structural functions, such as a connecting rod for example.

A second damping device for damping vibration of a vibrating component comprising at least one hollow element, for example a suspension bar for suspending said vibrating component, is obtained by producing said element in the form of the aforementioned damping structure. In the context of the present invention, the cavity of this element may either be a cavity that already exists or a cavity made specifically for implementing the present invention.

This second damping device has the additional advantage of not increasing the space occupancy.

The figures of the appended drawing will make it easy to understand how the invention may be embodied. In these figures, identical references denote elements which are similar.

BRIEF DESCRIPTION OF THE DRAWINGS

FIG. 1 schematically shows a damping structure according to the invention.

FIGS. 2 and 3 show structures according to the invention comprising various types of solid bodies.

FIGS. 4 to 7 and 8 to 11 show, schematically, various embodiments of internal partitions of the structure according to the invention, in a longitudinal view and in a plan view, respectively.

FIG. 12 schematically illustrates a mechanical breakdown of the structure according to the invention.

DETAILED DESCRIPTION OF THE INVENTION

Figures 1, 2:
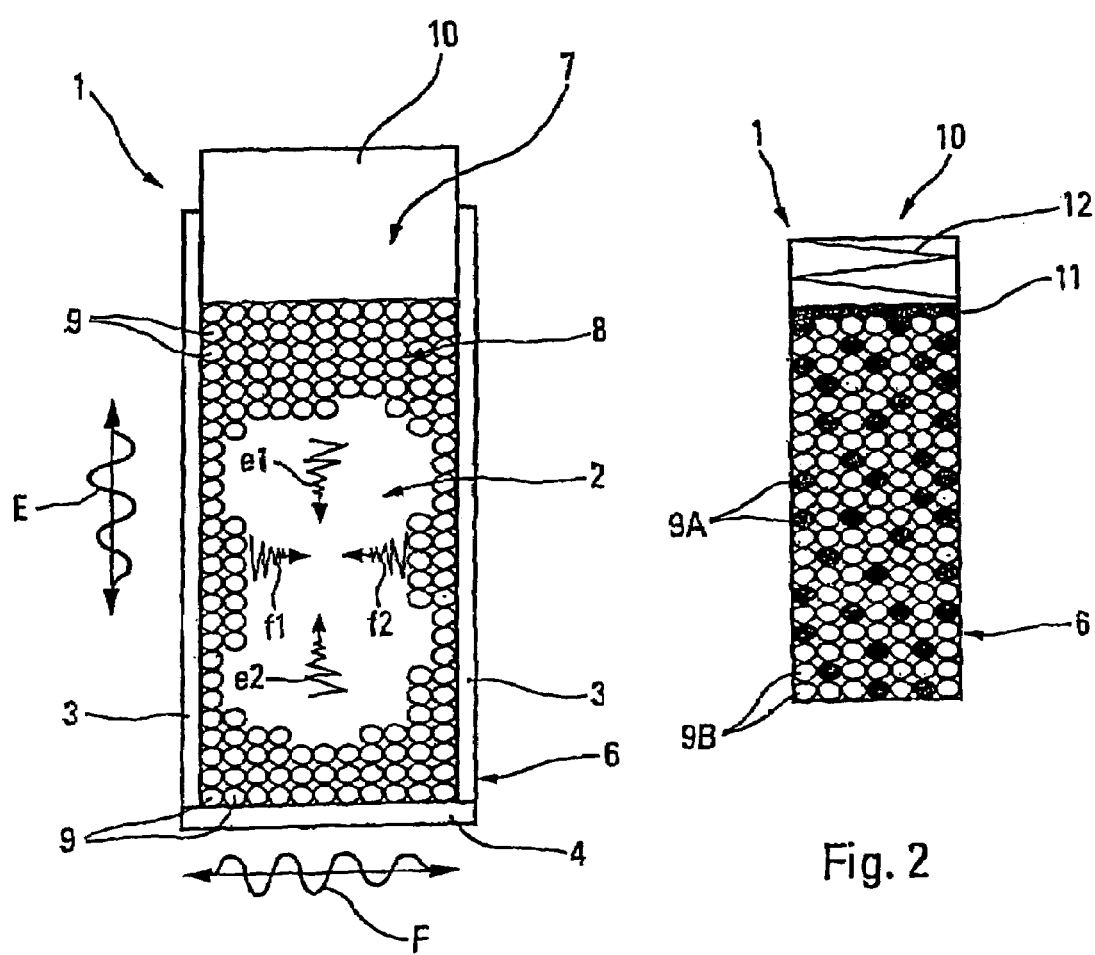

The damping structure 1 according to the invention and depicted schematically in FIG. 1 is a mechanical element specified hereinbelow which, according to the invention, has an internal cavity 2 surrounded by walls 3, 4 forming a chamber 6 and opening via an opening 7.

According to the invention, said structure 1 comprises:

an aggregate 8 which comprises solid bodies 9 in contact and which completely fills said internal cavity 2 although in order to simplify the drawing, solid bodies 9 have not been depicted in the whole of the cavity 6 in FIG. 1; and means 10 for closing off the internal cavity 2 and pressing said aggregate 8 into said internal cavity 2 against said walls 3 and 4.

Thus, when the structure 1 is subjected to vibration, for example longitudinal vibration E or lateral vibration F, this vibration is transmitted via the walls 3 and 4 to the solid bodies 9 (which are in contact) of the aggregate 8 which is pressed, via the various points of contact. On crossing each of these points of contact, some of the vibrational energy is dissipated through friction which means that said vibration is then damped quickly and effectively in said structure 1, as is depicted in FIG. 1, with dampings e1 and e2 for the longitudinal vibrations E and dampings f1 and f2 for the lateral vibrations F.

Of course, the structure 1 may have various shapes, and vary in its degree of massiveness. As a preference, however, it has an elongate shape, in the form bar for example, and said internal cavity 2 is formed longitudinally to said structure 1 inside a tubular chamber 6, as depicted in FIG. 1.

In the context of the present invention, said solid bodies 9, which are made, for example of synthetic material, preferably beads, may be:

either compact, their entire mass then being occupied by material;

or hollow, which makes it possible to reduce the weight of said solid bodies 9 and therefore also the weight of the structure 1.

In addition, according to the invention, said solid bodies 9:

may be made of different materials (polymer, metallic ceramic, elastomer, etc.), as depicted in FIG. 2 which shows solid bodies 9A and 9B of identical shape and size, but made of different materials; and/or may have different shapes and/or sizes (diameters), as depicted in FIG. 3, particularly in respect of the bodies 9C, 9D, 9E and 9F.

It will be noted that:

a difference in inertia of the solid bodies 9A to 9F, due in particular to different sizes or different densities; and/or a difference in stiffness of the solid bodies 9A and 9B, due especially to different materials (for example a material which is not very rigid and intrinsically has very good damping properties or a material which is more rigid and intrinsically has less good damping properties), give rise to a different movement under the effect of a vibrational excitation and therefore also to a different degree of damping. In consequence, through a suitable selection of these characteristics, it is possible to adjust and to optimize the damping performed by the structure 1.

In addition to said solid bodies 9, which may be compact or hollow, the aggregate 8 may also contain a viscous liquid, for example oil, filling the empty spaces in the chamber 6 between said solid bodies 9. These are then immersed in a lubricating medium, which makes it possible to delay any heating that might occur.

Moreover, in a preferred form of embodiment depicted in FIG. 2, the means 10 comprise:

a rigid plate 11, for example a metal plate, which is tailored to the opening 7 so as to be able, preferably with sealing, to close off the chamber 6; and an elastic means 12, preferably a spring, which exerts elastic pressure on said rigid plate 11 so as to constrain the aggregate 8, that is to say to press it into the chamber 6, and even possibly to compress it if it comprises a small amount of liquid or if the solid bodies 9 are not very rigid.

Furthermore, the damping structure 1 according to the invention additionally comprises at least one internal partition 13, which is secured to a wall 3 or 4 of the chamber 6 of the structure 1 and which is arranged inside the cavity 2.

By way of illustration, various examples of partition 13 are depicted:

in a schematic view in longitudinal section, in FIGS. 4 to 7; and in a plan view, in FIGS. 8 to 11.

As can be seen from these FIGS. 4 to 11, the partitions 13:

may be solid (FIGS. 4, 5, 6, 7, 8, 10 and 11) or pierced (FIGS. 5, 9 and 11); and may have any shapes, for example flat (FIGS. 4 to 9) or tubular (FIGS. 10 and 11). In the latter case, the partitions 13 may have any type of cross section; circular, elliptical, or simply any shape.

These internal partitions 13 make it possible to increase the exchange area and therefore the area for friction between, on the one hand, the interior faces of the walls 3, 4 of the chamber 6 and, on the other hand, the aggregate 8, something which makes it possible to increase the damping of the vibration of the structure 1.

In addition to the aforementioned advantages, the structure 1 according to the invention also has the following advantages:

it can easily be produced and has a low manufacturing cost, particularly when the internal cavity 2 already exists in the structure 1;

it is of low mass (particularly when use is made of hollow solid bodies 9) by comparison with certain known damping means, such as damping materials bonded directly onto the surface of the structure that is to be damped;

the aggregate it contains is protected against external attack (fire, moisture, corrosive agents, etc.) by the chamber 6;

it is effective over a broad band of frequencies and this is true for various types of deformation (bending, tension-compression, torsion, etc.) of the structure 1;

it is not subjected to phenomena of abrasion, corrosion or erosion, if an appropriate pair of materials is chosen for the wall 3, 4 of the structure 1 and for the aggregate 8, respectively; and it leads to no change in the life of the components with which it is associated.

The physical effect of the filling (of the cavity 2 by the aggregate 8) on the vibrational behavior of an initially hollow structure 1 (the cavity 2 existing, but being empty) will be specified hereinbelow with reference to FIG. 12.

Three different types of loading of the hollow structures 1 may be dealt with by filling with an aggregate 8, namely:

bending;

tension-compression; and torsion.

The vibrational response of a hollow structure 1 is considered as the linear superposition of second-order system responses, each characterized by a natural frequency, modal damping, a modal mass and a modal stiffness.

At a given frequency, the structure 1 and the collection of aggregate 8 may be replaced by two coupled systems depicted in FIG. 12, in which:

MA and KA represent, respectively, the true modal mass and the true modal stiffness of the untreated structure 1 loaded in bending, longitudinal or torsion;

MB represents the equivalent mass of the aggregate 8, set in motion by the coupling with the hollow structure 1 loaded in bending, longitudinal or torsion; and CB indicates the internal friction provided by the aggregate 8.

The filling of the cavity 2 modifies the vibrational response of the structure 1 but does not modify the excitation force F0 originating from the excitation upstream (the housing, for example, in the case of a helicopter main gearbox).

Under harmonic conditions, the respective displacements during the time x1(t) and x2(t), the respective velocities v1(t) and v2(t) and the respective accelerations γ1(t) and γ2(t) satisfy, for any angular frequency ω of the excitation force of amplitude F, where $F0(t)=F(\omega)\cdot\sin(\omega t)$:

$$v1(t)=j\omega x1(t)$$

and $$v(2)t=j\omega x2(t)$$

$$\gamma 1(t)=-\omega^2 x1(t)$$

and $$\gamma 2=-\omega^2 x2(t).$$

The sum of the applied forces (return forces, friction force due to the coupling with the other mass, and possibly external force F0) for each mass being equal to its inertial force, it is therefore possible to write, for each mass:

as a function of time t:
  in the case of the mass MA: $F0(t)-KAx1(t)-CB(v1(t)-v2(t))=MA\gamma 1(t)$
  in the case of the mass MB: $O-CB(v2(t)-v1(t))=MB\gamma 2(t)$ as a function of angular frequency ω:
  in the case of the mass MA: $F(\omega)-KAX1(\omega)-CBj\omega(X1(\omega)-X2(\omega))=-MA\omega^2 X1(\omega)$
  in the case of the mass MB: $O-CBj\omega(X2(\omega)-X1(\omega))=-MB\omega^2 X2(\omega)$ with $j^2=-1$ and X1(ω) and X2(ω) being complex quantities.

From there, it is easy to determine (by considering the frequency f in Hz) the force/acceleration amplitude spectrum and the spectrum of the phase shift of the acceleration with respect to force, these being accessible through measurement (with $f=\omega/2\pi$ and $fA=\omega A/2\pi$, fA and ωA being, respectively, the natural frequency and the natural angular frequency of the structure A (unfilled structure 1)).

From that, it can be deduced that the effect of the filling (aggregate 8) of the chamber 6 on the vibrational behavior of the structure 1 results in:
  a strong decrease in the maximum amplitude response (defining the resonant frequency of the damped system);
  a relatively significant slide in the maximum of the amplitude response toward the low frequencies;
  a significant widening of the amplitude response spectrum; and
  a significant flattening of the phase response curve.

Furthermore, the coefficient CB may be expressed theoretically near the natural mode ωA by:

$$CB=\alpha B\ 2\pi fA\ mB\ \tan(\delta B)$$

with:
  αB: a dimensionless coefficient which indicates the actual effectiveness of the filling;
  δB: an intrinsic loss angle for the filling material, known beforehand; and
  mB: the physical mass added by the filling (aggregate 8).

It is therefore found to be true that:
  the greater the material loss angle, the greater the equivalent damping;
  the equivalent damping is proportional to mB; and
  the better the quality of contact, the better the damping efficiency of the filling (aggregate 8).

Optimizing the damping consists in increasing CB, that is to say the damping mass of the aggregate 8, which is defined by $\alpha B\ mB\ \tan(\delta B)$.

The technological parameters that allow this damping mass to be increased are:
  in the case of the loss angle δB:
    the number of types of solid bodies 9 used (one single type or a mixture of several types);
    the nature of the constituents: polymer, metallic ceramic or elastomer;
    the viscosity of any filling liquid used,
  in the case of the effectiveness coefficient αB:
    the surface finish of the solid bodies 9 that make up the aggregate 8;
    the static compacting pressure generated by the means 10,
  in the case of the mass of filling mB:
    the mean volumetric mass of the solid bodies 9 of which the aggregate 8 is made;
    the mean diameter of the solid bodies 9 of which the aggregate 8 is made;
    the wall thickness of the solid bodies 9 of which the aggregate 8 is made, if the bodies are hollow.

Numerous applications are of course possible for the damping structure 1 according to the invention.

In particular, said structure 1 can be used to damp vibration of various types of vibrating component. It may thus, in particular, be employed as part:
  of a connecting bar connecting between a support that is to be isolated with respect to vibration and a casing surrounding rotating parts generating this vibration, as will be seen in greater detail hereinafter with reference to FIG. 13; or
  of the suspension for an engine, a gearbox or a rotating part, such as a compressor or a fan, for example.

According to the invention, in order to suspend a vibrating component with respect to a support in such a way as to isolate the latter from the vibration of said vibrating component, one or more structures 1, particularly in the form of bars, may:
  be attached and arranged at free points between the vibrating component and the support; or
  replace elements, for example connecting rods, which already exist on the component or the support; or
  be formed in elements (hollow or otherwise) which already exist.

The last two solutions additionally have the advantage of not adding to the bulk.

Preferred applications of the damping structure 1 relate to the reduction of noise-generating vibration in a rotary-wing aircraft, particularly a helicopter, and in particular to reducing:
  the running or meshing noise from gearboxes; and/or
  the running or meshing noise of auxiliary units (lubricating pumps, drive of ventilating and air-conditioning units, etc.), which noise is very annoying in the cabin, both for the pilots and the passengers.

Figure 13:
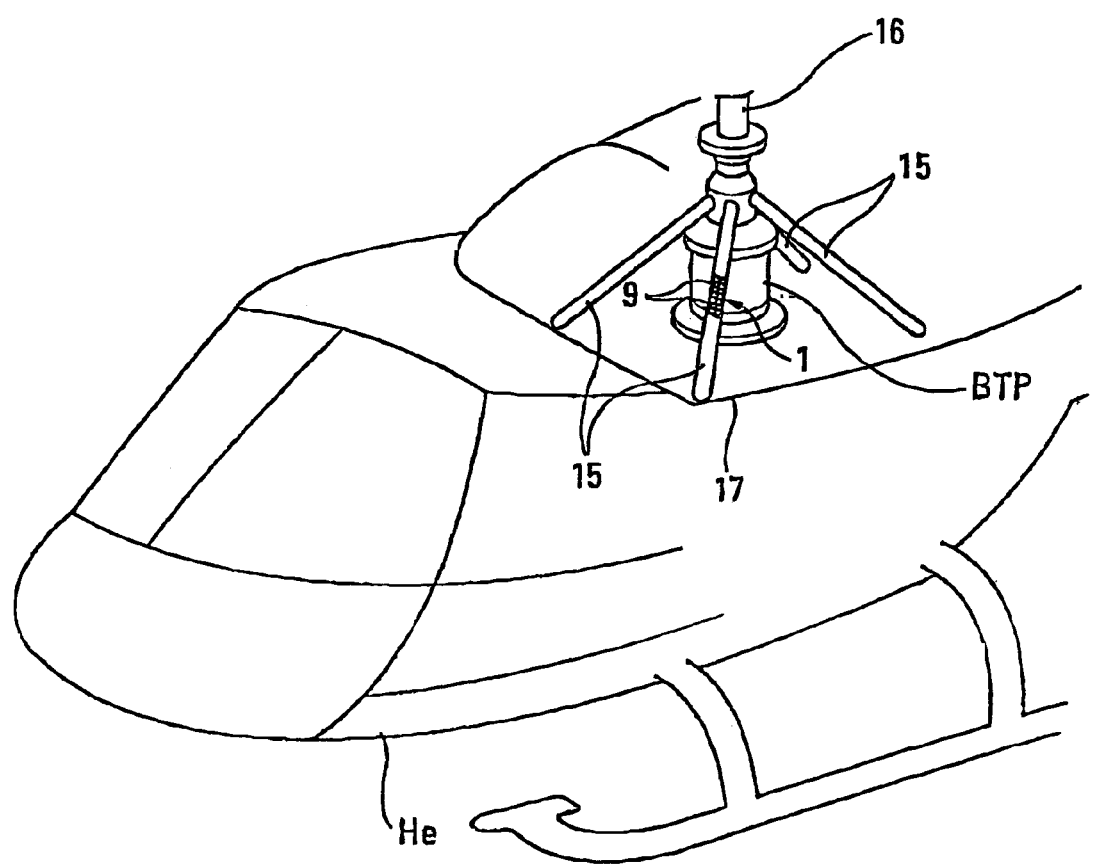
FIG. 13 shows a preferred application of the structure according to the invention, relating to the suspension of the main gearbox of a helicopter.

The particular application of the invention depicted in FIG. 13 is intended to increase the damping of suspension bars 15 of a system used for the suspension of the main gearbox BTP (connected to the mast 16 of the lift and forward travel rotor) of a helicopter He, which suspension bars 15 are arranged on the fuselage 17 of the helicopter He.

To do this, the suspension bars 15 each comprise a damping structure 1 according to the invention, as can be seen in the case of one of these bars 15 which is partially cut away in FIG. 13.

This is done in order to reduce, in the cabin, the noise propagated through solid transmitted by the bars 15, that is to say the vibrational energy transmitted by said bars 15, indicated by an expression $|H(f)| |\gamma bar|^2(f)$ specified hereinbelow.

In general, it may be considered that the acoustic pressure spectrum in the cabin of the helicopter He, denoted Pcab(f), satisfies the following quadratic relationship:

$$Pcab^2(f)=|T(f)| |Pdirect|^2(f)+|H(f)| |\gamma bar|^2(f)+|Q(f)| |\gamma structure|^2(f)$$

Specifically, this summing of squared amplitudes indicates the balance of energy transfers for the meshing noise at frequencies higher than 500 Hz. There is no need to take account of the phase relationships between the pressure in the cabin and the direct pressure or accelerations of the structure (fuselage) of the helicopter He, given the great many acoustic modes present in the cabin at these frequencies.

It will be noted that:
the term $|T(f)| |Pdirect|^2(f)$ represents the quadratic acoustic pressure in the cabin, due solely to the noise radiated directly by the main gearbox BTP of the helicopter He. $|T(f)|$ represents the modulus of the coefficient of acoustic transmission (dimensionless) of the noise radiated through the air of amplitude Pdirect as far as the cabin;
the term $|H(f)| |\gamma bar|^2(f)$ represents the acoustic pressure in the cabin, due solely to the noise radiated in the cabin by the structure (part of the fuselage 17) excited by the vibration of the attachments of the bars 15. $|H(f)|$ represents the effectiveness of acoustic radiation in the cabin of the vibration of this part of the fuselage;
the term $|Q(f)| |\gamma structure|^2(f)$ represents the quadratic acoustic pressure in the cabin due solely to the noise radiated in the cabin by the remainder of the fuselage which is not excited by the vibration of the attachments of the bars 15, but by the bottom of the gearbox BTP for example. $|Q(f)|$ represents the modulus of the coefficient of acoustic radiation in the cabin of this last part of the fuselage.

From the foregoing, it would seem that the reduction of the noise in the cabin will be significant at the meshing frequencies for which the following relationship is satisfied in the absence of treatment:

$$|H(f)| |\gamma bar|^2(f) >> |T(f)| |Pdirect|^2(f) + |Q(f)| |\gamma structure|^2(f).$$

The invention claimed is:

1. A damping system for an aircraft, the damping system comprising a number of damping bars, wherein at least one of said damping bars comprises a damping structure comprising:
a member which is rigid and which defines an internal cavity;
an aggregate which comprises at least solid bodies in contact and which fills said internal cavity; and
a closing device for closing off said internal cavity, whereby vibrations of the damping bars are transmitted to the solid bodies of the aggregate, vibrational energy is dissipated through friction, so that vibrations are damped quickly and effectively.

2. A damping system according to claim 1, wherein said aggregate comprises hollow bodies.

3. A damping system according to claim 2, wherein said hollow bodies comprise hollow beads.

4. A damping system according to claim 3, wherein said hollow beads are made of synthetic material.

5. A damping system according to claim 4, wherein said aggregate completely fills said internal cavity.

6. A damping system according to claim 4, wherein the member defining the cavity has walls forming a chamber having an opening, the opening being closed off with sealing.

7. A damping system according to claim 4, wherein said damping structure is elongate, said internal cavity being formed longitudinally inside the elongate structure.

8. A damping system according to claim 4, wherein said closure is a rigid plate.

9. A damping system according to claim 8, wherein said damping structure comprises an elastic device which exerts elastic pressure on said rigid plate so as to constrain said aggregate.

10. A damping system for an aircraft, the damping system comprising a number of damping bars, wherein at least one of said damping bars comprises a damping structure comprising:
a member which is rigid and which defines an internal cavity;
an aggregate which comprises at least solid bodies in contact and which fills said internal cavity, said aggregate comprising hollow beads which are made of synthetic material; and
a closing device for closing off said internal cavity, whereby vibrations of the damping bars are transmitted to the solid bodies of the aggregate, vibrational energy is dissipated through friction, so that vibrations are damped quickly and effectively.

11. A damping system according to claim 10, wherein said aggregate completely fills said internal cavity.

12. A damping system according to claim 10, wherein the member defining the cavity has walls forming a chamber having an opening, the opening being closed off with sealing.

13. A damping system according to claim 10, wherein said damping structure is elongate, said internal cavity being formed longitudinally inside the elongate structure.

14. A damping system according to claim 13, wherein said damping structure comprises an elastic device which exerts elastic pressure on said rigid plate so as to constrain said aggregate.

15. A damping system according to claim 10, wherein said closing device is a rigid plate.

* * * * *